May 6, 1930.　　　　L. R. SIEGEL　　　　1,757,595
DENTAL ROOT CANAL POINT
Filed Nov. 30, 1928

Louis R. Siegel, Inventor
By John A. Bornhardt
Attorney

Patented May 6, 1930

1,757,595

UNITED STATES PATENT OFFICE

LOUIS R. SIEGEL, OF CLEVELAND, OHIO

DENTAL ROOT-CANAL POINT

Application filed November 30, 1928. Serial No. 322,648.

This invention relates to improvements in gutta percha points that are inserted into the root canal of a tooth after the nerve has been extracted.

The main object of the invention is to provide such a root canal point with a groove that extends from the upper portion of the canal point nearly to its point.

Another object is to provide a root canal point with such a groove so that air or liquid or gases which collect in the pockets of the root canal may readily escape and thereby allow the proper seating of the gutta percha point.

Figure 1:
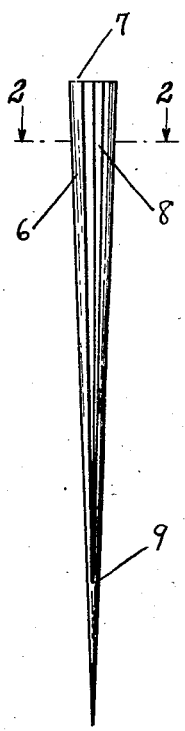
Figure 2:
Figure 3:
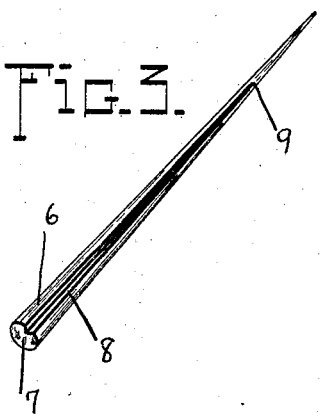
Figure 4:
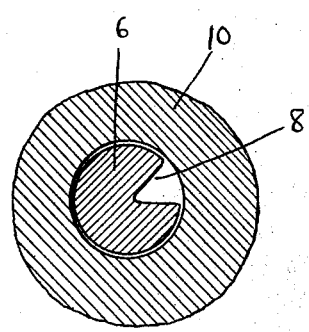
Figure 5:
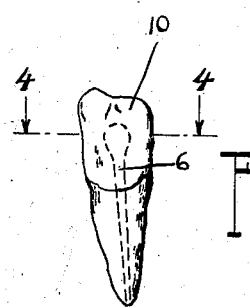

Further objects and advantages will be seen when taken in connection with the following description and drawings in which:

Fig. 1 is a plan view of the canal point showing the groove; Fig. 2 is a section on the line 2—2 of Fig. 1; Fig. 3 is a perspective view; Fig. 4 is a section on the line 4—4 of Fig. 5; and Fig. 5 shows the cavity in the tooth with the canal point inserted therein.

In the drawings the numeral 6 represents the canal point as a whole which is preferably made of gutta percha, but may be constructed of any desirable substance suitable for the purpose. Extending longitudinally from the top 7 of the root canal point and to the point 9 is the groove 8. It will be noted that this groove 8 does not extend the entire length of the point. This groove 8 allows air, liquid or gases which may creep into the root pockets to escape and thus enable the proper seating of the gutta percha point. The proper seating of this point is very desirable and advantageous.

As shown in Fig. 4 the tooth 10 has inserted within the root canal the gutta percha point 6.

I claim:

1. A root canal point provided with a groove.

2. A canal point provided with a groove extending from the rear end thereof nearly to the front end.

3. A canal point adapted to be inserted into the root canal of a tooth, said canal point being provided with a longitudinal groove, said groove adapted to convey air, liquid or gases.

In testimony whereof, I do affix my signature.

LOUIS R. SIEGEL.